United States Patent [19]
Orii

[11] 4,199,786
[45] Apr. 22, 1980

[54] VIDEO/INTERCARRIER SOUND DETECTING CIRCUIT IN TELEVISION RECEIVER

[75] Inventor: Toshio Orii, Moriguchi, Japan

[73] Assignee: Sanyo Electric Co., Ltd., Osaka, Japan

[21] Appl. No.: 890,394

[22] Filed: Mar. 27, 1978

[30] Foreign Application Priority Data

Mar. 26, 1977 [JP] Japan .................................. 52/34810
Mar. 26, 1977 [JP] Japan .................................. 52/34812

[51] Int. Cl.² .............................................. H04N 5/62
[52] U.S. Cl. ............................................... 358/197
[58] Field of Search ................... 358/188, 197, 198; 325/327

[56] References Cited

U.S. PATENT DOCUMENTS

3,697,685  10/1972  Lunn ..................................... 358/188
3,812,921  5/1974   Skerlos ................................. 358/188

OTHER PUBLICATIONS

Wilcox, "A New TV Video/Sound Detector IC", *IEEE Transactions on Broadcast and Television Receivers*, 1974, vol. BTR-20, pp. 6-13.

*Primary Examiner*—John C. Martin
*Attorney, Agent, or Firm*—Armstrong, Nikaido, Marmelstein & Kubovcik

[57] ABSTRACT

A video detecting circuit and an intercarrier sound signal generating circuit suited for implementation in an integrated circuit for use in a television receiver, comprising a video intermediate frequency amplifier including a final stage video intermediate frequency transformer, a tuning circuit coupled to the video intermediate frequency amplifier to be tuned to the video intermediate frequency for withdrawing a video intermediate frequency carrier signal, a diode connection coupled to the tuning circuit for pulsing the video intermediate frequency carrier signal, a double balanced synchronous detector responsive to the video intermediate frequency amplifier and the pulsing circuit for synchronous detecting the video intermediate frequency signal for providing a detected video signal, and a double balanced multiplier coupled to receive the primary and secondary signals at the primary and secondary windings of the video intermediate frequency transformer for evaluating the product of the primary and secondary signals for providing a sound intermediate frequency signal. Preferably, a phase shifter is provided in the double balanced multiplier for causing a phase difference of an odd number times the phase of $\pi/2$ between the primary and secondary signals to be applied to the double balanced multiplier.

7 Claims, 7 Drawing Figures

VIDEO/INTERCARRIER SOUND DETECTING CIRCUIT IN TELEVISION RECEIVER

BACKGROUND OF THE INVENTION

1. Field of the Invention

The present invention relates to an improved video-/intercarrier sound detecting circuit in a television receiver. More specifically, the present invention relates to a video detecting circuit and an intercarrier sound signal generating circuit particularly suited for implementation in an integrated circuit in a television receiver.

2. Description of the Prior Art

In view of a decreased mixed modulation of synchronous detection of a video intermediate signal for obtaining a detected video signal, a synchronous detector has been proposed and widely used for detection of a video signal from a video intermediate frequency signal in television receivers. It has also been proposed and practiced that a common multiplier is utilized for synchronous detection of a video intermediate frequency signal for providing a detected video signal and for multiplication of a video intermediate frequency signal for providing an intercarrier sound signal in the form of a sound signal of the frequency 4.5 MHz which is a beat of the video carrier frequency 58.75 MHz and the sound carrier frequency 54.25 MHz.

FIG. 1 shows a block diagram of the above described typical conventional video synchronous detector which is commonly utilized for generation of an intercarrier sound signal. Referring to FIG. 1, the video intermediate frequency signal from the final stage of the video intermediate frequency amplifier is applied to a video carrier frequency signal extracting circuit 1 and a multiplier 2. The video intermediate frequency carrier signal of the frequency 58.75 MHz obtained from the video intermediate frequency carrier signal extracting circuit 1 is also applied to the other input of the multiplier 2. The multiplier is responsive to the video intermediate frequency carrier signal from the video intermediate frequency signal extracting circuit 1 and the video intermediate frequency signal from the video intermediate frequency amplifier to effect synchronous detection of the video intermediate frequency signal as a function of the video intermediate frequency carrier signal to provide a detected video signal, as well known to those skilled in the art. The detected video output is applied to a video circuit 3. As well known to those skilled in the art, the multiplier 2 also provides an intercarrier sound signal of the frequency 4.5 MHz that is a beat of the video carrier frequency 58.75 MHz and the sound carrier frequency 54.25 MHz (Japanese Television Standard). The intercarrier sound signal is applied to a sound circuit 4.

FIG. 2 shows a schematic diagram of the video intermediate frequency carrier signal extracting circuit 1 and the multiplier 2, as implemented in an integrated circuit. The video intermediate frequency signal as received as a differential signal at input terminals 5 and 6 is applied to a pair of emitter followers Q1 and Q2 and the output video intermediate frequency signals from the emitter followers Q1 and Q2 are applied to the base electrodes of a pair of differential operating transistors Q3 and Q4, respectively, constituting a differential amplifier that constitutes the video intermediate frequency carrier signal extracting circuit 1. The collector electrodes of the differential operating transistors Q3 and Q4 are coupled to a parallel connection of an inductance coil L1 and a capacitor C1 provided externally of the integrated circuit that constitutes a tuning circuit 7 tuned to the central frequency of 58.75 MHz. Therefore, the video intermediate frequency carrier signal is extracted at the collector electrodes of the above described differential operating transistors Q3 and Q4. The collector electrodes of the differential operating transistors Q3 and Q4 are coupled to each other through diodes D1 and D2 in opposite polarities. Therefore, the video intermediate frequency carrier signal as obtained at the collector electrodes of the differential operating transistors Q3 and Q4 are subjected to a limiting function by these diodes D1 and D2, whereby the video intermediate frequency carrier signal is pulsed or is converted into a pulse form. The pulse signal of the video intermediate carrier frequency is obtained at each of the collector electrodes of the differential operating transistors Q3 and Q4 in an opposite polarity to each other and is applied to the corresponding one of a pair of emitter followers Q5 and Q6. The pulse outputs from the emitter followers Q5 and Q6 are applied as a switching control signal to the base electrodes of a pair of upper differential operating transistors Q7 and Q8 and another pair of upper differential operating transistors Q9 and Q10 of a double balanced synchronous detector that constitutes the multiplier 2. On the other hand, the base electrodes of a further pair of lower differential operating transistors Q11 and Q12 of the above described multiplier 2 are connected to receive the video intermediate frequency signal obtainable from the emitter followers Q1 and Q2. As a result, multiplication is made of the video intermediate frequency signal from the emitter followers Q1 and Q2 and the above described pulse control signal as applied to the upper differential operating transistors. As a result, a detected video signal is obtained through synchronous detection and an intercarrier sound signal of the frequency 4.5 MHz is obtained as a beat of the video and sound carrier frequencies at output terminals 8 and 9 as a differential output form. The video signal and the intercarrier sound signal thus obtained are separately extracted by individual filters, not shown, to be provided in the video and sound circuits, respectively.

Since in the above discussed conventional video/intercarrier sound dectecting circuit a detected video signal and an intercarrier sound signal are obtained by the use of a single common multiplier structured to make multiplication of the video intermediate frequency signal by a pulse output of the video intermediate frequency carrier signal as a switching operation, buzz noises and the like are liable to occur for the reasons to be described in the following, that degrade the sound quality in television receivers. More specifically, since the video intermediate frequency signal is obtained from a televised signal, the amplitude of the extracted video intermediate frequency carrier signal is liable to fluctuate, as shown in FIG. 3, in accordance with amplitude modulation. Therefore, when the extracted video intermediate frequency carrier signal is pulsed by means of the limiting diodes D1 and D2 to unify the signal level, a portion a having a large amplitude is completely pulsed as shown as a' in FIG. 4, while portions b and c having smaller amplitude is incompletely pulsed as shown as b' in FIG. 4 or is not pulsed at all as shown as c' in FIG. 4, with the result that pulsing is diversified depending on the amplitude modulation, and thus a residual amplitude component contained in the switching control signal as applied to the multiplier 2.

Another problem is caused with the above described conventional video/intercarrier sound detecting circuit as shown in FIG. 2. More specifically, when one of the limiting diodes D1 and D2 becomes conductive, the other is cut off to function as a capacitance. As a result, it follows that these diodes D1 and D2 exhibits a somewhat rectifying function with respect to the extracted video intermediate frequency signal, which causes harmonics with respect to the above described amplitude modulation component. This means that when a video signal of the frequency 2.25 MHz is received, a frequency component 4.5 MHz that is the second harmonic of the above described video signal is applied to the base electrodes of the upper stage pairs of differential operating transistors Q7 and Q8 and Q9 and Q10 constituting the multiplier 2. As a result, a pseudo sound signal is obtained and is applied to the sound circuit 4, thereby to degrade the quality of sound.

In this context, a video/intercarrier sound detecting circuit of interest is described in the article, entitled "A New TV Video/Intercarrier Sound Detector IC" by Milton E. Wilcox, in IEEE Transaction on Broadcast and TV Receivers. The above discussed problems encountered in the video/intercarrier sound detector shown in FIGS. 1 and 2 are solved to some extent by the video/intercarrier sound detector described in the above referenced article. More specifically, in accordance with the above referenced article, a separate sound detector is employed. The approach used therein is a half wave equivalent of the multiplier which switches the video carrier with the sound carrier input signal to produce a desired difference frequency. The sound detecting circuit shown has a separate input for the sound carrier and applies the video carrier signal derived in the video detector to the base electrodes of the lower differential operating transistors of the half wave equivalent of the multiplier. The output is tuned to the sound intermediate frequency of 4.5 MHz. Nevertheless, the problems discussed previously in conjunction with the sound quality are not fully solved by the video/intercarrier sound detector in the above referenced article. More specifically, in accordance with the video/intercarrier sound detector in the above referenced article, the video carrier signal derived in the video detector is applied to the sound detector, which means that the video carrier signal of a very large signal level is applied to the sound detector rather in the form of a switching control signal. Thus, according to the above referenced article, the sound detector does not operate in a linear manner but rather operates in a non-linear manner. The fact that the sound detector operates rather in a non-linear manner is liable to cause harmonics, which degrades the quality of sound, as fully discussed previously. In this context, there is room for improvement in the video/intercarrier sound detector described in the above referenced article.

SUMMARY OF THE INVENTION

Briefly described, the present invention comprises a television receiver, comprising: a video intermediate frequency amplifier, means coupled to the video intermediate frequency amplifier for extracting the video intermediate frequency carrier signal, synchronous detecting means responsive to the video intermediate frequency carrier signal from the video intermediate frequency carrier extracting means and the video intermediate frequency output from the video intermediate frequency amplifier for synchronously detecting the video intermediate frequency signal with the video intermediate frequency carrier signal for providing a detected video signal, means for withdrawing the detected video signal, multiplier means having first and second inputs each receiving the video intermediate frequency signal for evaluating the product of the first input signal and the second input signal including a difference component of the video and sound carriers, and means responsive to the product output from the multiplier means for withdrawing an intercarrier sound signal.

According to the present invention, the sound detecting multiplier is adapted to receive directly the video intermediate frequency signal as the first and second input signals. Since the video intermediate frequency signal is utilized which is of a low level and a linear form, a multiplying operation is carried out in a rather linear manner. As a result, the harmonics occuring in the multiplying operation is considerably reduced. As a result, the quality of sound as reproduced is enhanced.

According to another aspect of the present invention, a phase shifter means is provided for causing a phase difference of an odd number times the phase of $\pi/2$ between the first and second input signals to be applied to the sound detecting multiplier. As a result, any adverse affect that could be caused by the amplitude modulation component in the video intermediate frequency signal can be eliminated or extremely reduced.

In a preferred embodiment of the present invention, the first and second inputs of the sound detecting multiplier are coupled to the primary and secondary, respectively, of the last stage video intermediate frequency transformer in the video intermediate frequency amplifier.

Accordingly, a principal object of the present invention is to provide an improved video/intercarrier sound detecting circuit in a television receiver, particularly suited for implementation in an integrated circuit.

Another object of the present invention is to provide an improved video/intercarrier sound detecting circuit in a television receiver, wherein the quality of a reproduced sound is enhanced.

A further object of the present invention is to provide an improved video/intercarrier sound detecting circuit in a television receiver separately employing a synchronous video detector and a sound detecting multiplier.

Still a further object of the present invention is to provide an improved video/intercarrier sound detecting circuit in a television receiver separately employing a synchronous video detector and a sound detecting multiplier, wherein any adverse affect caused by an amplitude modulation component in the video intermediate frequency signal is reduced.

These objects and other objects, features, aspects and advantages of the present invention will become more apparent from the following detailed description of the present invention when taken in conjunction with the accompanying drawings.

DESCRIPTION OF THE PREFERRED EMBODIMENTS

According to an essential feature of the present invention, a sound detecting multiplier is separately provided from a synchronous video detector, wherein the sound detecting multiplier is adapted to receive a video intermediate frequency signal without using a pulsed output obtainable from the synchronous video detector.

Figure 1:
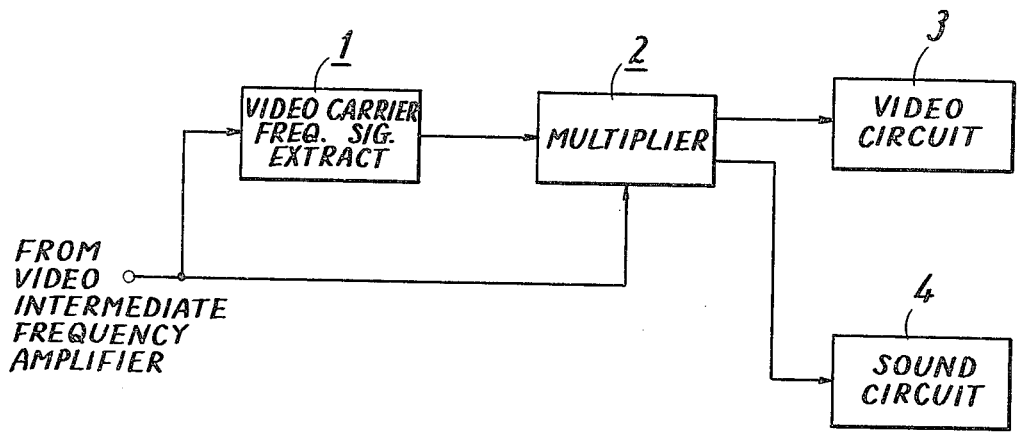
FIG. 1 shows a block diagram of a conventional video/intercarrier sound detecting circuit employing a synchronous detector in a television receiver.
Figure 2:
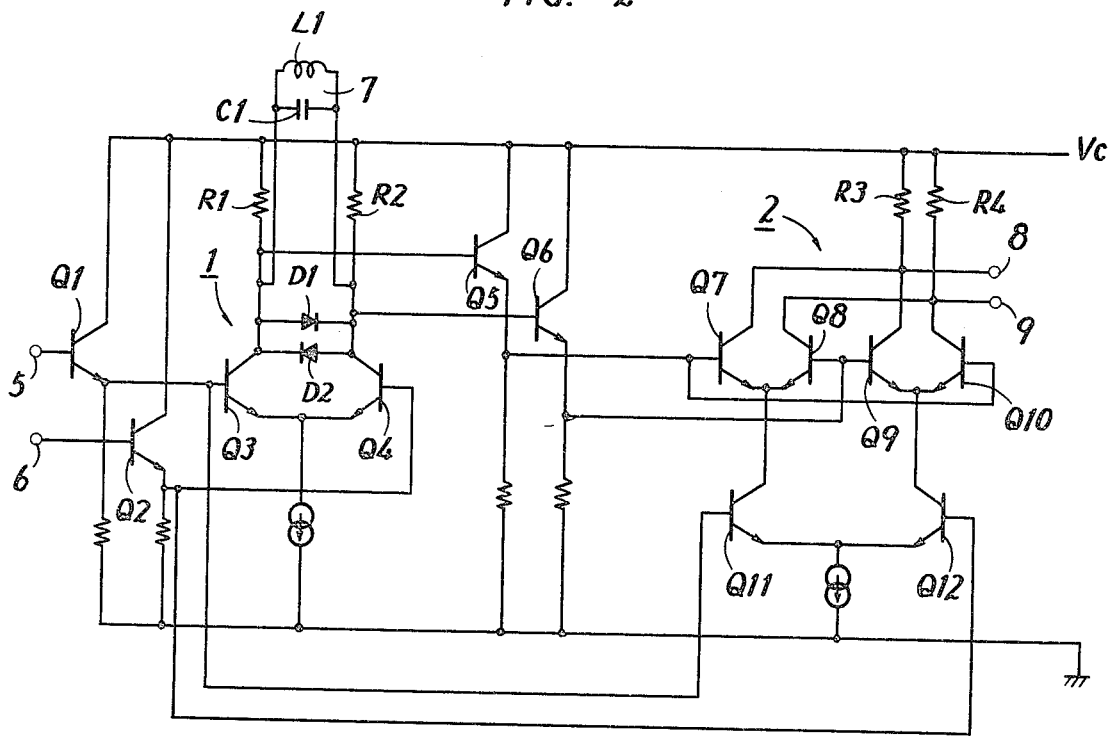
FIG. 2 shows a schematic diagram of a video intermediate frequency carrier extracting circuit and a multiplier in a conventional video/intercarrier sound detecting circuit.
Figure 3:
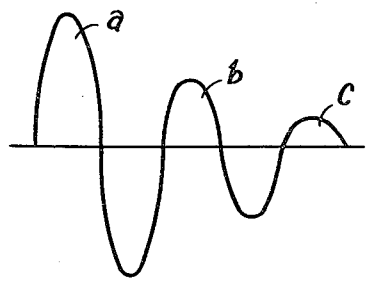
FIGS. 3 and 4 show wave forms of electrical signals in the FIG. 2 diagram for explanation of the operation thereof.
Figure 4:
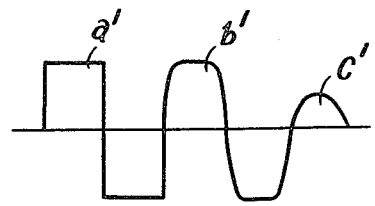
Figure 5:
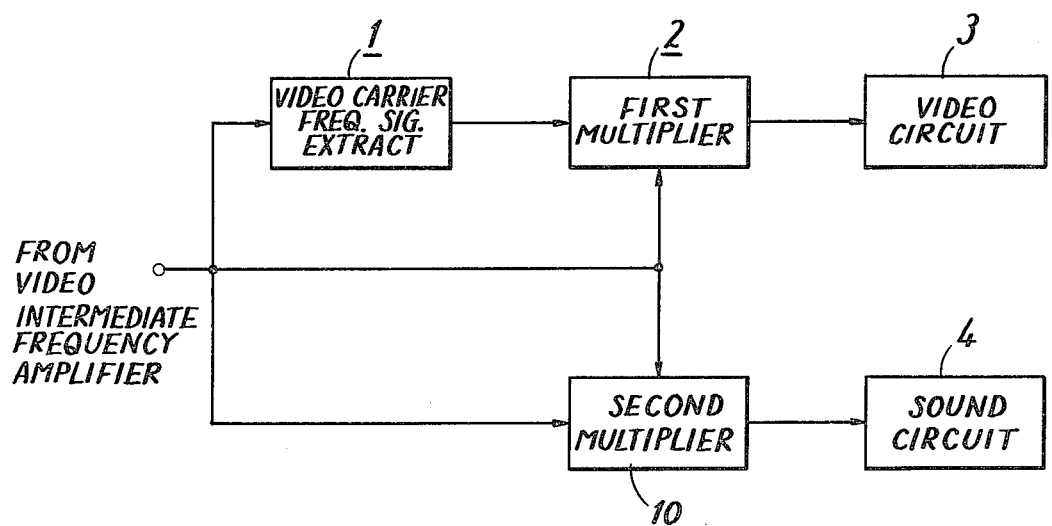
FIG. 5 shows a block diagram of the inventive video-/intercarrier sound detecting circuit in a television receiver.

FIG. 5 shows a block diagram of the inventive video-/intercarrier sound detecting circuit. In comparison with the FIG. 1 diagram, the FIG. 5 video/intercarrier sound detecting circuit comprises a second multiplier 10 apart from a first multiplier 2 corresponding to the multiplier 2 in FIG. 2. The second multiplier 10 is connected to receive the video intermediate frequency signal from the video intermediate frequency amplifier as a first and second input signals. The first multiplier 2 is utilized as a synchronous video detector. On the other hand, the second multiplier 10 is utlized as a sound detecting multiplier. The output from the first multiplier 2 is coupled to the video circuit 3 and the output of the second multiplier 10 is coupled to the sound circuit 4. Since the remaining portions in the FIG. 5 diagram are the same as those in the FIG. 1 diagram, it is not believed necessary to describe any more.

Figure 6:
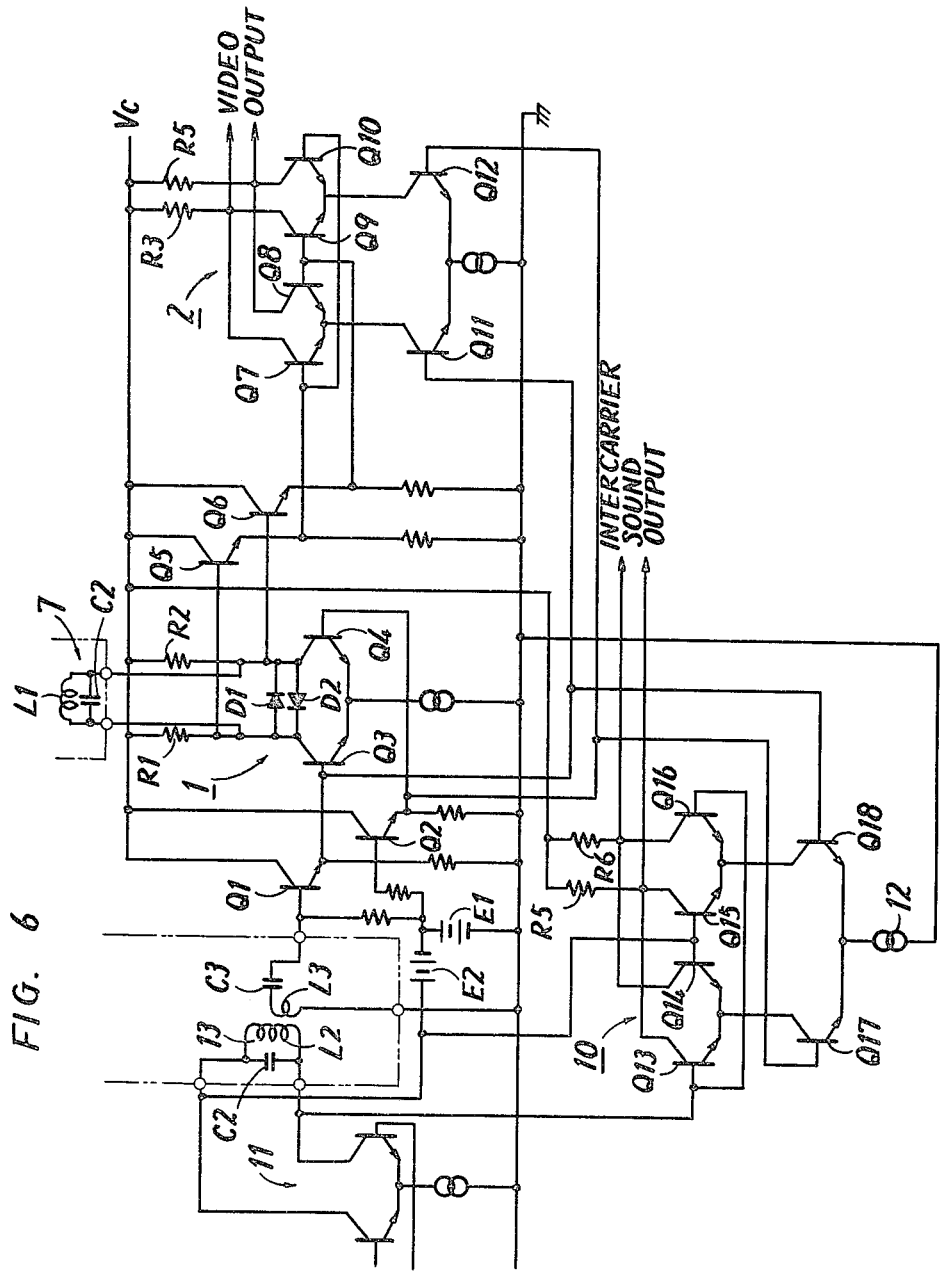
FIG. 6 shows a schematic diagram of one embodiment of the inventive video/intercarrier sound detecting circuit.

FIG. 6 shows a schematic diagram of one embodiment of the inventive video/intercarrier sound detecting circuit in accordance with the FIG. 5 block diagram. Since the FIG. 6 embodiment resembles in part the FIG. 2 diagram, the same portions have been denoted by the same reference characters in FIGS. 2 and 6. In comparison with the FIG. 2 diagram, the FIG. 6 embodiment additionally comprises the second multiplier 10 serving as an intercarrier sound signal generator, which is also configured in a double balanced circuit comprising a first upper stage pair of differential operating transistors Q13 and Q14 and a second upper stage pair of differential operating transistors Q15 and Q16 which are coupled to receive the output from the final stage 11 of the video intermediate frequency amplifier and a lower pair of differential operating transistors Q17 and Q18 coupled to a constant current source 12 and serving by themselves as a constant current to the above described upper stage differential operating transistors Q13 and Q14 and Q15 and Q16, the lower stage differential operating transistors Q17 and Q18 being coupled to receive the video intermediate frequency signal from the emitter followers Q1 and Q2. It is pointed out that the embodiment shown has been adapted such that the signal is applied from the emitter followers Q1 and Q2 to the lower stage transistors Q17 and Q18 in a single ended fashion; however, the circuit may be configured such that the signal is applied in a double ended fashion. It is, therefore, intended that both are covered by the present invention. The collector electrodes of the upper stage differential operating transistors are coupled to load resistors R5 and R6 in a well known manner, as done in conjunction with the first multiplier 2, and the collector electrodes of the upper stage differential operating transistors in the second multiplier 10 are coupled through a 4.5 MHz band pass filter in the sound circuit 4.

As seen from FIG. 6, the base electrodes of the upper stage differential operating transistors Q13 and Q14 and Q15 and Q16 in the second multiplier 10 are coupled to a primary circuit including a parallel connection of an inductance coil L2 and a capacitor C2 of a video intermediate frequency transformer 13 in the final stage video intermediate frequency amplifier 11, while the base electrodes of the lower stage differential operating transistors Q17 and 18 in the second multiplier 10 are coupled to the emitter followers Q1 and Q2 which are coupled to a secondary circuit including a series connection of an inductance coil L3 and a capacitor C3 of the video intermediate frequency transformer 13 in the final stage video intermediate frequency amplifier 11.

Thus, it would be appreciated that the second multiplier 10 is connected to receive the first input from the primary circuit of the final stage video intermediate frequency transformer 13 and the second input signal from the secondary circuit of the final stage video intermediate frequency transformer 13. As a result, the second multiplier 10 is supplied with, at both the first and second inputs thereof, a video intermediate frequency signal of a relatively low level, as not pulsed. Therefore, the second multiplier 10 achieves a relatively linear operation rather than a switching operation. Such a linear operation is facilitated by inserting resistors in the emitter electrodes of the differential operating transistors Q13 and Q14 and Q15 and Q16, thereby to broaden the linear operational range. Since in the FIG. 6 embodiment the second multiplier 10 has been coupled to receive a video intermediate frequency signal of a relatively low level, such emitter resistors have been dispensed with.

In the embodiment shown, a biasing circuit has been improved to implement the same economically, which is particularly advantageous in implementing the inventive video/intercarrier sound detecting circuit and the video intermediate frequency amplifier in a single chip integrated circuit. More specifically, the bias circuit comprises a series connection of a first and second biasing voltage source E1 and E2 and the positive terminal of the second voltage source E2 is coupled to the video intermediate frequency amplifier including the final stage video intermediate frequency amplifier 11 for the purpose of supplying a biasing voltage and the positive terminal of the second voltage source E2 is also applied to the upper stage differential operating transistors of the second multiplier 10, while the junction of the first and second voltage sources E1 and E2 is coupled to the lower stage differential operating transistors Q17 and Q18 through the emitter followers Q1 and Q2, inasmuch as the lower stage differential operating transistors Q17 and Q18 need be supplied with a voltage lower than the voltage to be applied to the upper stage differential operating transistors. The direct current output voltage from the emitter followers Q1 and Q2 is also applied as a base bias of the differential operating transistors Q3 and Q4 constituting the video intermediate frequency carrier extracting circuit 1 for the first video detecting multiplier 2 and is also applied as a base bias of the lower differential operating transistors Q11 and Q12 of the first multiplier 2. Thus, the embodiment shown has been contemplated such that the biasing voltages required at various portions therein are supplied from a least number of biasing voltage sources and the signal transmission path is utilized for supplying the bias voltages to various portions. For this reason, the FIG. 6 embodiment is extremely advantageous in implementing the same together with the remaining portion of the video intermediate frequency amplifiers in a single chip integrated circuit. It is pointed out that the above described final stage video intermediate frequency transformer 13 including the coils L2 and L3 and the capacitors C2 and C3 is provided externally of such an integrated circuit.

As understood from the foregoing description, according to the essential feature of the present invention, a first multiplier of such as a double balanced type is provided for synchronous detection of a video intermediate frequency signal as a function of the pulsed output of the video intermediate frequency carrier signal for providing a detected video signal and a second multiplier of such as a double balanced type is separately provided such that the upper and lower stage differential operating pairs are supplied with a video intermediate frequency signal from the video intermediate frequency signal amplifier, whereby an intercarrier sound signal is obtained through multiplication of two video intermediate frequency signal inputs. It has been observed that according to the inventive video/intercarrier sound detecting circuit any pseudo sound signal encountered in the conventional video/intercarrier sound detecting circuit is eliminated. In addition, since the second multiplier is adapted for a linear operation, any distortion of the sound signal in the second multiplier is avoided and hence the quality of a reproduced sound in a television receiver employing the present invention is enhanced.

Although the FIG. 6 embodiment has substantially eliminated the shortcomings encountered in the prior art video/intercarrier sound detecting circuit, there is still further room for improvement in the FIG. 6 embodiment from the standpoint of reduction of buzz noises for the reasons to be described subsequently. More specifically, it could happen that the video intermediate frequency carrier signal as extracted is still subjected to an amplitude fluctuation for some reason, which could cause harmonics with respect to the above described amplitude fluctuation component. Therefore, when the video signal of the frequency 900 KHz is received, the 4.5 MHz component of the fifth harmonic is applied to the base electrodes of the upper stage differential operating transistors Q7 and Q8 and Q9 and Q10 constituting the first multiplier 2, which causes a pseudo signal in the sound circuit 4, with the result that the quality of a repdocued sound is degraded.

The foregoing may be explained using the following mathematical expression. Assuming that the video modulation index is m, the angular frequency of the modulated signal is $\omega P$, the angular frequency of the video carrier wave is $\omega C$, and the angular frequency of the sound carrier wave is $\omega S$, then the synchronous detection may be expressed by the following formula:

$$[(1+m \cos \omega Pt) \cos \omega Ct + \cos \omega St] \times [(1+m \cos \omega Pt) \cos \omega Ct + \cos \omega St] \quad (1)$$

However, since only the video carrier wave signal $\cos \omega Ct$ in the video intermediate frequency signal is required to produce the intercarrier sound signal, formula (1) may be expressed as follows:

$$[(1+m \cos \omega Pt) \cos \omega Ct + \cos \omega St] \times \cos \omega Ct \quad (1A)$$

When the components $2\omega C$ and $(\omega S + \omega C)$ in the above described formula are cut by the use of the respective filters, then the following formula is obtained:

$$\tfrac{1}{2}(1+m \cos \omega Pt) + \tfrac{1}{2} \cos (\omega C - \omega S) t \quad (2)$$

The formula (2) corresponds to a case where the carrier wave extracted from the carrier wave extracting circuit is completely pulsed. However, in actuality some amplitude modulation component remains as described previously. Therefore, each term is divided by the residual amplitude modulation component $1 + m \cos \omega Pt/A$, so that the following formula is obtained:

$$\tfrac{1}{2}(1+m \cos \omega Pt) \times (1+m \cos \omega Pt/A) + \tfrac{1}{2} \cos (\omega C - \omega S) t \times (1+m \cos \omega Pt/A) \quad (3)$$

The first term in the formula (3) indicates that the harmonics of the modulated signal could appear and that when $\omega P = \omega C - \omega S/5$ a pseudo signal component $\omega C - \omega S$ occurs by the component $\omega P$.

If and when the circuit configuration as shown in FIGS. 5 and 6 is employed, then the situation may be expressed by the above described formula (2). Although the first term in the formula (2) does not include any harmonic as different from the above described formula (3), the amplitude modulation signal component of the video signal is required in obtaining an intercarrier sound signal corresponding to the second term and should be preferably eliminated.

Therefore, according to another aspects of the present invention, an improvement in the FIG. 6 embodiment is provided, wherein the first term in the above described formulas (2) and (3) is eliminated to properly eliminate or considerably reduce any influence caused by the amplitude modulation component of the video signal.

More specifically, according to an another aspect of the present invention, the above described second sound detecting multiplier is adapted to receive a first and second input signals with a phase difference of an odd number times the phase of $\pi/2$.

In practicing the present invention, if the second sound detecting multiplier 10 is adapted to receive the first and second input signals with a phase difference of $\pi/2$, then the following formula is obtained:

$$[(1+m \cos \omega Pt) \cos \omega Ct + \cos \omega St] \times \cos (\omega Ct + \pi/2) \quad (4)$$

If and when the components $2\omega C$ and $(\omega C + \omega S)$ are removed by means of the respective filters, the above described formula (4) may be expressed as follows:

$$\tfrac{1}{2} \cos (\omega Ct - \omega St + \pi/2) \quad (5)$$

The above described formula (5) may further be changed to the following:

$$-\tfrac{1}{2} \sin (\omega C - \omega S) t \quad (6)$$

Thus it would be appreciated that nothing corresponding to the first term in the formula (2) occurs. Assuming that the same is applied to the FIG. 5 embodiment, then it would be further appreciated that as seen in the formulas (5) and (6) no amplitude modulation component occurs.

Figure 7:
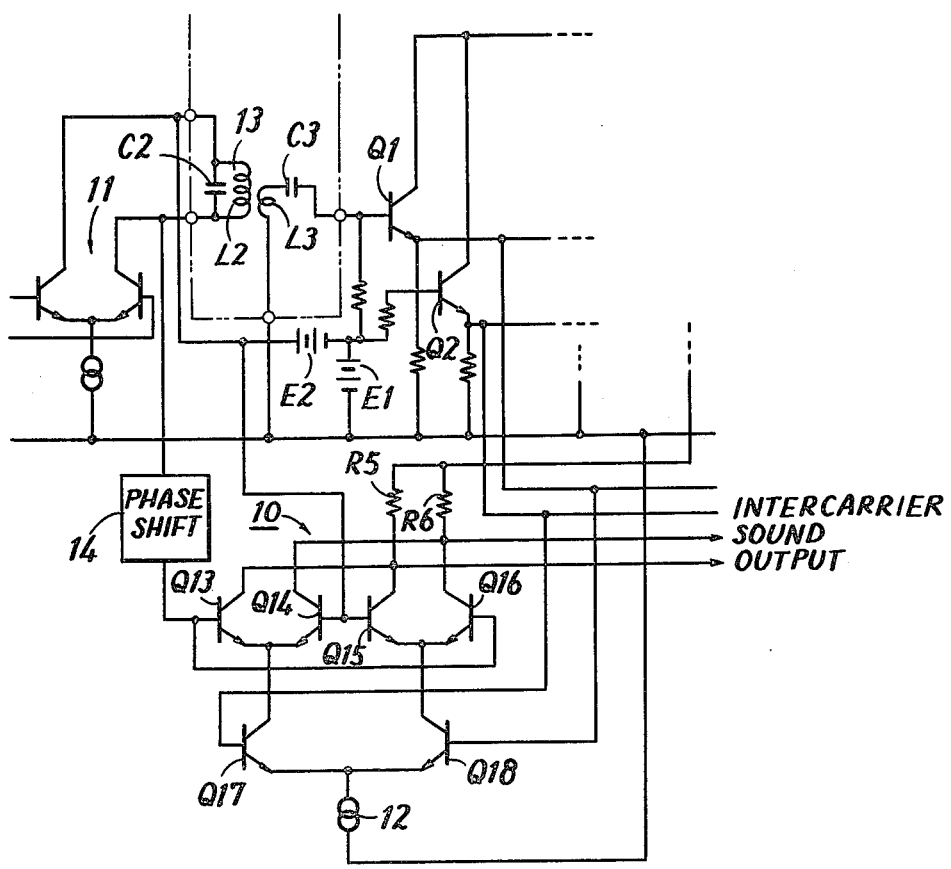
FIG. 7 shows a schematic diagram of a portion of a modified embodiment of the inventive video/intercarrier sound detecting circuit.

FIG. 7 shows a schematic diagram of a left half portion in the FIG. 6 embodiment, wherein the above described additional feature of the present invention has been practiced. In the following, only a modified portion will be described in the FIG. 7 embodiment in comparison with the FIG. 6 embodiment. Since the remaining portions in the FIG. 7 embodiment are substantially the same as those in the FIG. 6 embodiment and have been denoted by the same reference characters, it is not believed necessary to describe the same again in detail. Now with particular reference to the left portion in FIG. 7, and particularly to a line running from the primary circuit of the video intermediate frequency transformer 13 to the base electrode of the transistor Q13, a phase shifter 14 is interposed in the line, such that one input signal to the multiplier 10 is phase shifted by the phase $\pi/2$ or an odd number times the phase $\pi/2$ with respect to the second input signal to be applied to the multiplier 10. As a result, the foregoing description made in conjunction with the mathematical equations is achieved and a reproduced sound of good quality is effectively obtained.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A video/intercarrier sound detecting circuit in a television receiver, comprising:
   video intermediate frequency amplifying means for amplifying a video intermediate frequency signal including a video carrier signal and a sound carrier signal having a predetermined frequency difference therebetween,
   means operatively coupled to said video intermediate frequency amplifying means for extracting the video intermediate frequency carrier signal,
   means responsive to said video intermediate frequency carrier signal and the video intermediate frequency signal from said video intermediate frequency amplifying means for synchronously detecting said video intermediate frequency signal with said video intermediate frequency carrier signal for providing a detected video signal, and
   multiplier means operatively coupled to said video intermediate frequency amplifying means and having a first and second inputs each adapted to receive the video intermediate frequency signal from said video intermediate frequency amplifying means for evaluating the product of the first and second input signals applied to said first and second inputs for providing the product output including a difference component of said video carrier frequency and said sound carrier frequency as a sound intermediate frequency signal.

2. A video/intercarrier sound detecting circuit in a television receiver in accordance with claim 1, which further comprises means operatively coupled to said multiplier means for causing a phase difference of an odd number times the phase of $\pi/2$ between said first input signal and said second input signal.

3. A video/intercarrier sound detecting circuit in a television receiver in accordance with claim 1, wherein said video intermediate frequency amplifying means comprises video intermediate frequency transformer means having a primary circuit and a secondary circuit magnetically coupled to each other, said first input of said multiplier means being coupled to said primary circuit of said video intermediate frequency transformer means and said second input of said multiplier means being coupled to said secondary circuit of said video intermediate frequency transformer means.

4. A video/intercarrier sound detecting circuit in a television receiver in accordance with claim 1, wherein said carrier wave extracting means comprises means responsive to said extracted carrier wave signal for pulsing the same, and said synchrnous detecting means comprises means responsive to said pulse output from said pulsing means for synchronously detecting said video intermediate frequency signal.

5. A video/intercarrier sound detecting circuit in a television receiver in accordance with claim 4, wherein said synchronous detecting means comprises a double balanced synchronous detector.

6. A video/intercarrier sound detecting circuit in a television receiver in accordance with claim 1, wherein said multiplier means comprises a double balanced detector.

7. A video/intercarrier sound detecting circuit in a television receiver in accordance with claim 1, wherein said synchronous detecting means comprises a double balanced synchronous detector adapted for a switching operation, and said multiplier means comprises a double balanced detector adapted for a linear operation.

* * * * *